Figure 3:
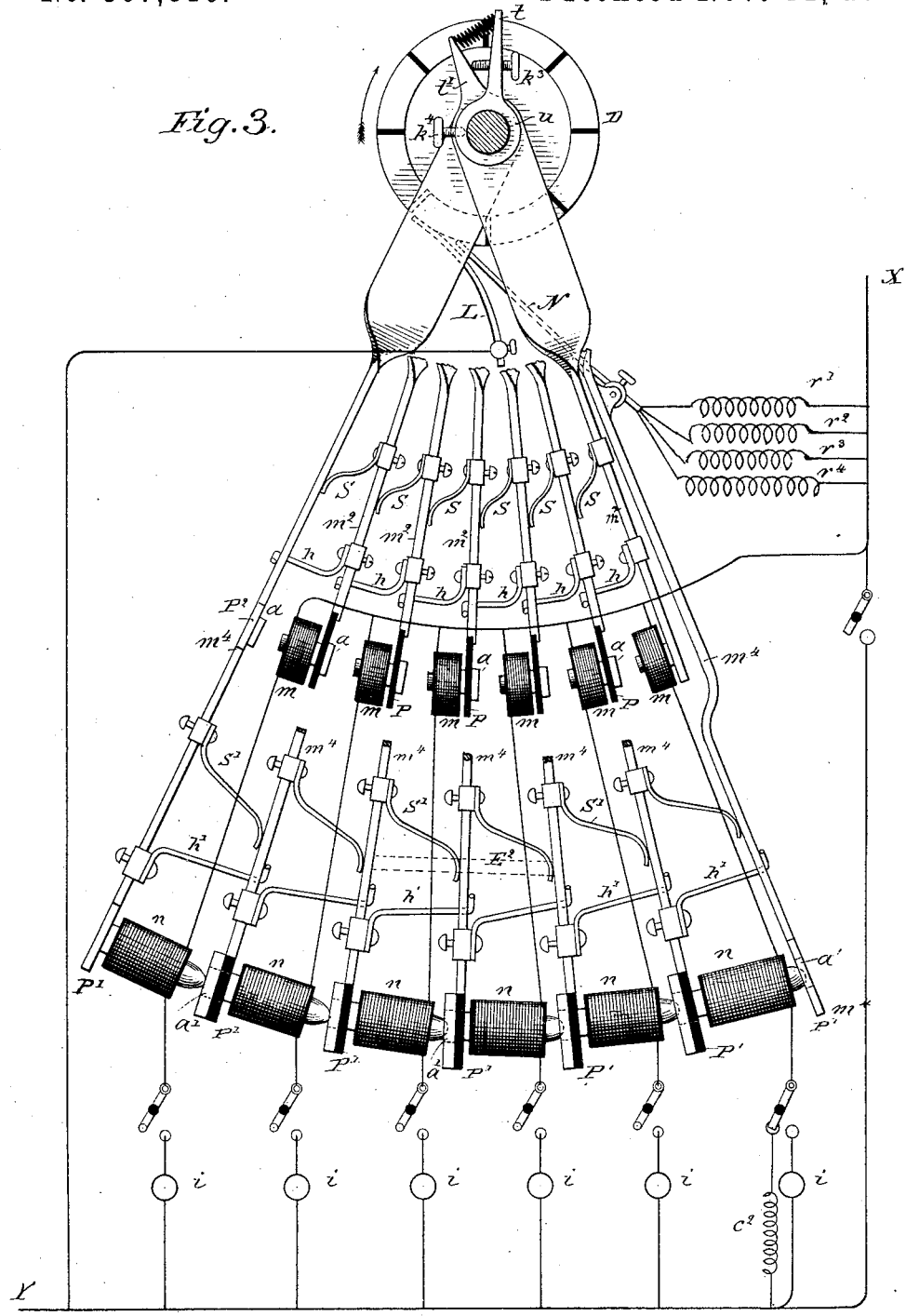

(No Model.) 6 Sheets—Sheet 1.
J. J. SKINNER.
APPARATUS FOR REGULATING AND DISTRIBUTING ELECTRIC CURRENTS.
No. 307,810. Patented Nov. 11, 1884.
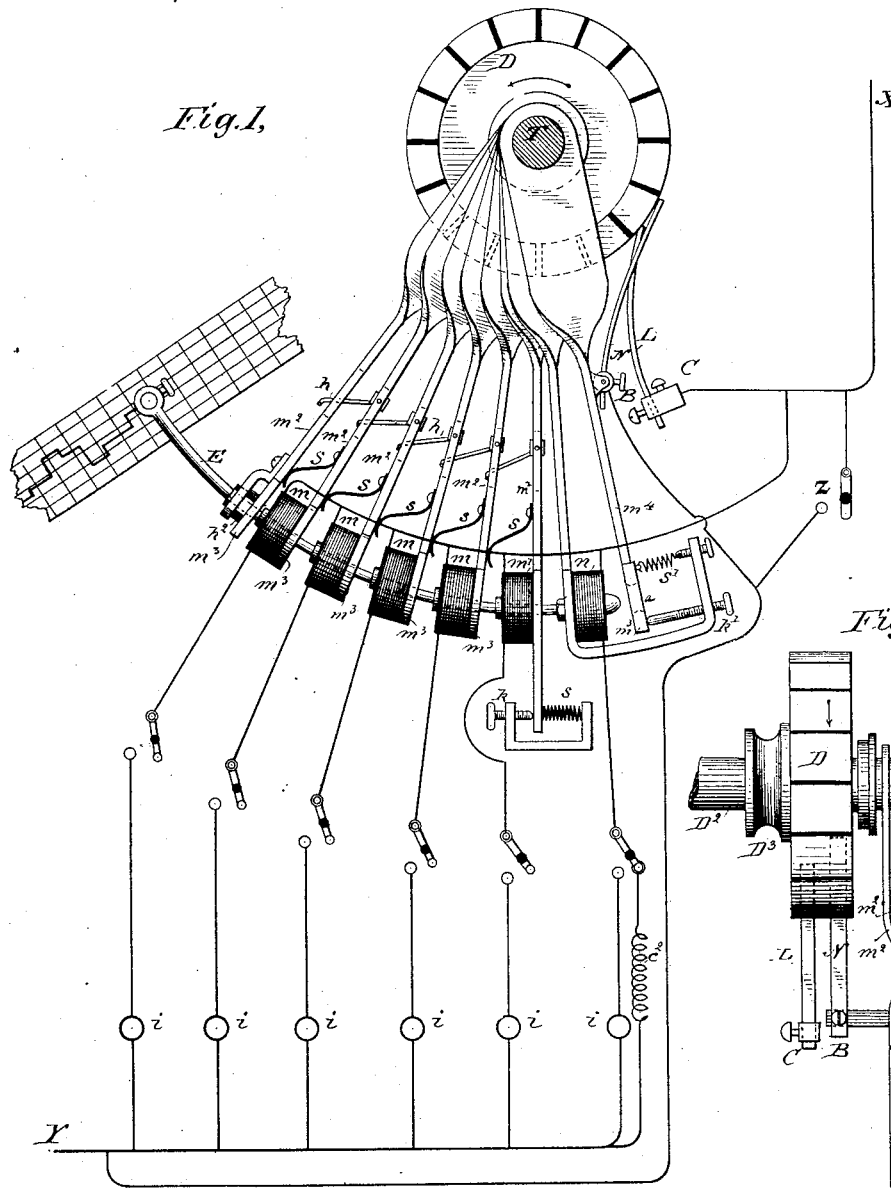
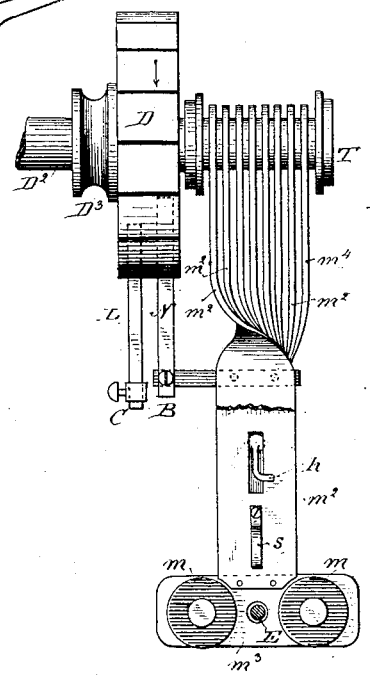
Witnesses:
Ernest Abshagen
Thos. Toomey
Inventor:
Joseph J. Skinner
By his Attorney: H. C. Townsend (No Model.)  6 Sheets—Sheet 3.
J. J. SKINNER.
APPARATUS FOR REGULATING AND DISTRIBUTING ELECTRIC CURRENTS.
No. 307,810.  Patented Nov. 11, 1884.
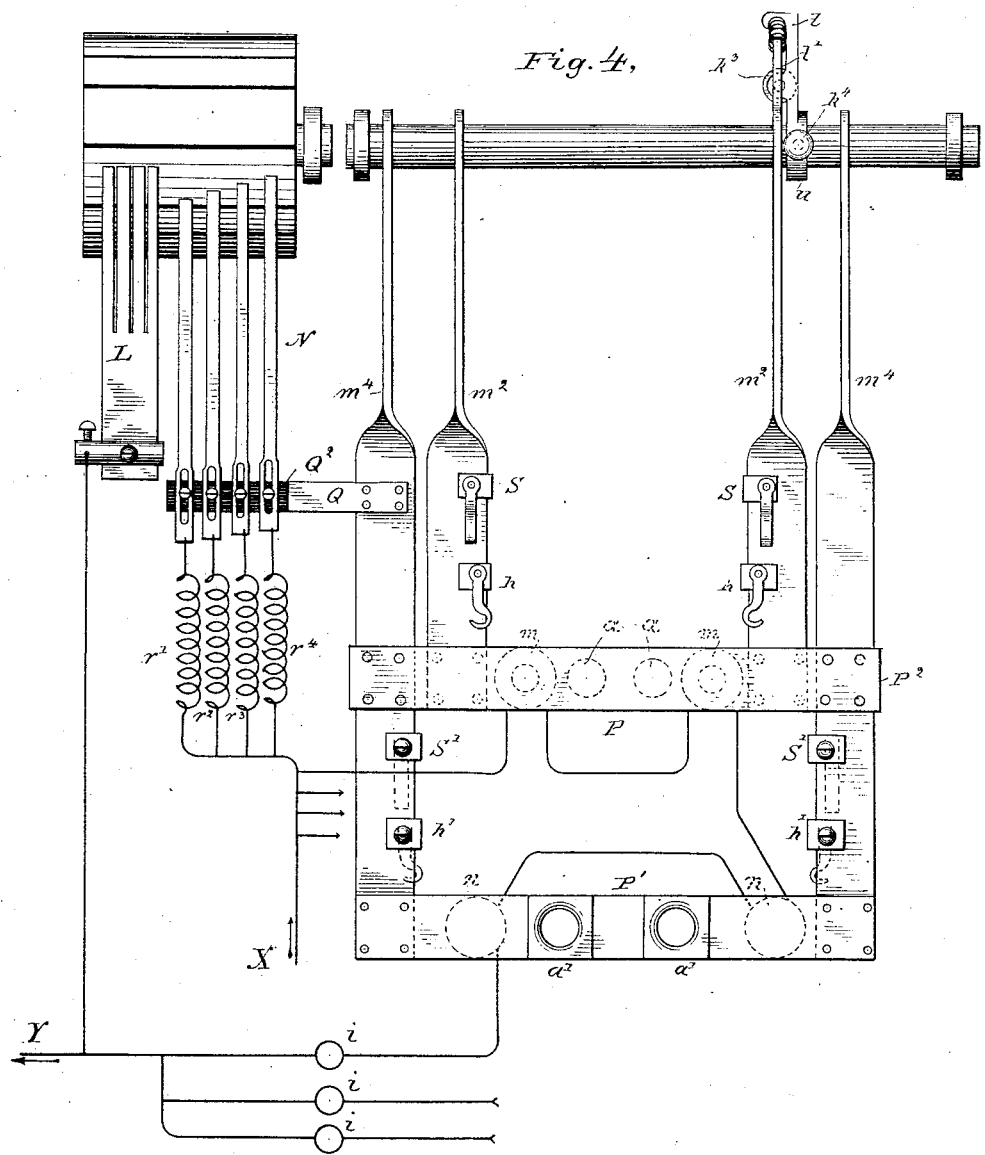
Fig. 4.
Fig. 5.
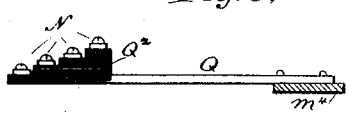
Witnesses:  Inventor:
Ernst Abshagen  Joseph J. Skinner,
Thos. Dooney  By his Attorney H. L. Townsend (No Model.) 6 Sheets—Sheet 4.
J. J. SKINNER.
APPARATUS FOR REGULATING AND DISTRIBUTING ELECTRIC CURRENTS.
No. 307,810. Patented Nov. 11, 1884.
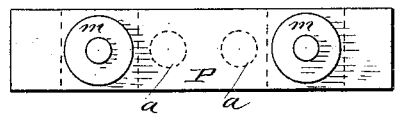
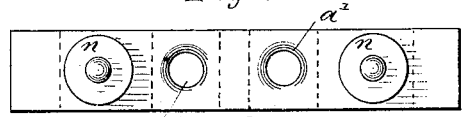
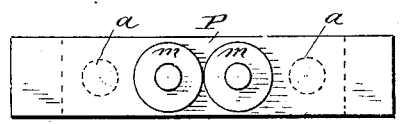
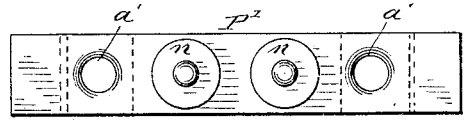
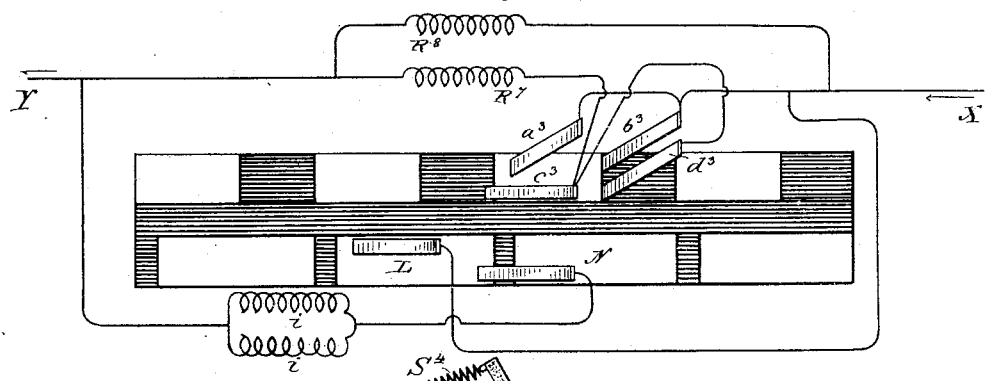
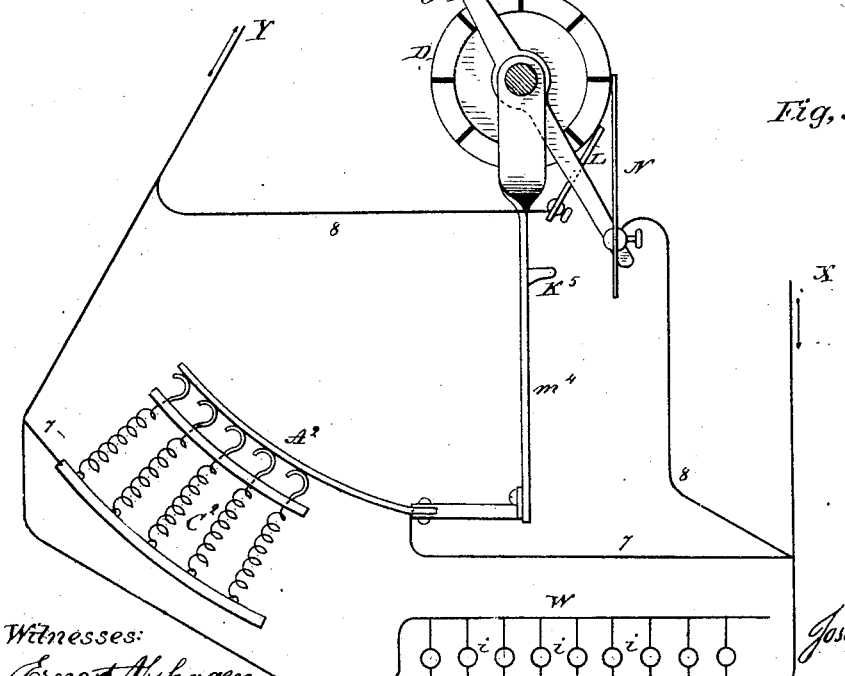
Witnesses:
Inventor: Joseph J. Skinner,
By his Attorney:

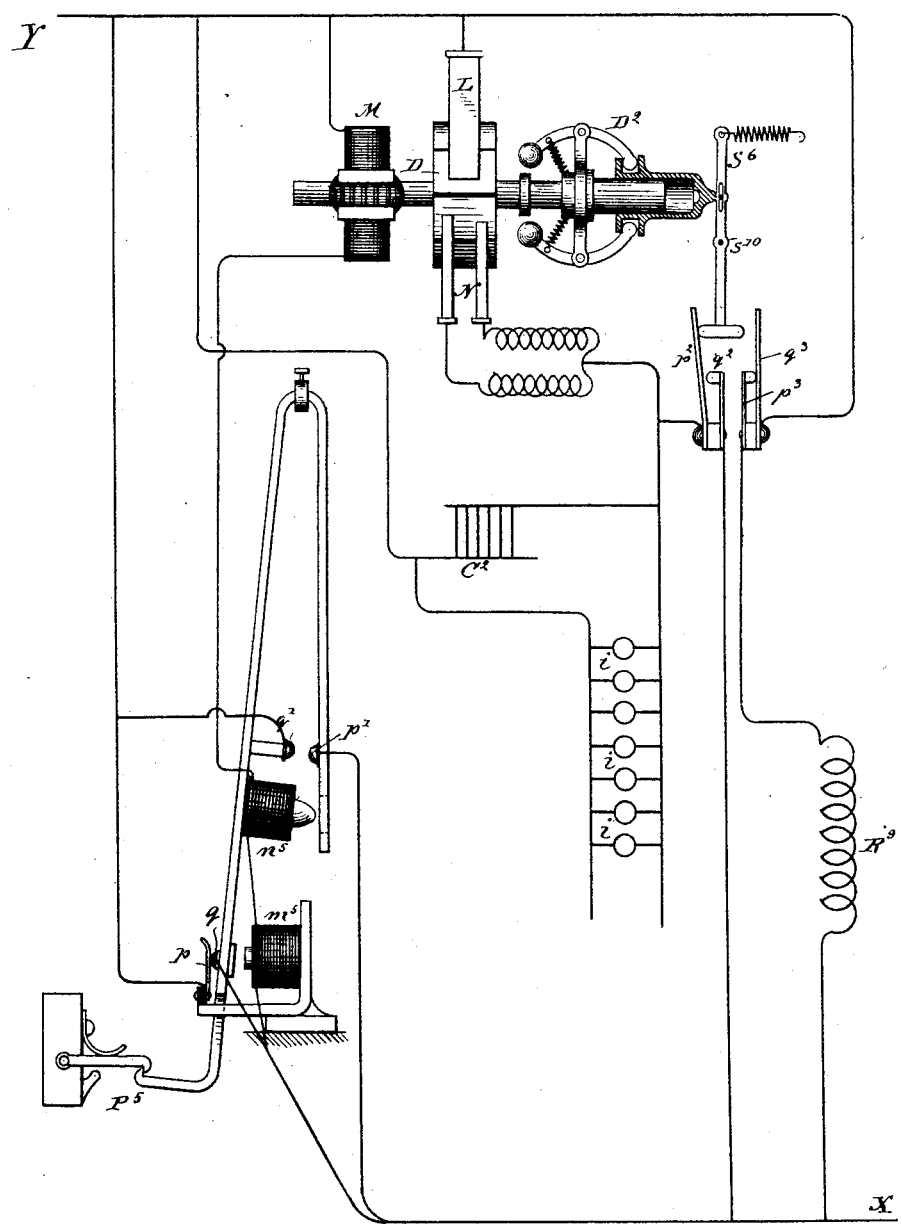

(No Model.) 6 Sheets—Sheet 6.
J. J. SKINNER.
APPARATUS FOR REGULATING AND DISTRIBUTING ELECTRIC CURRENTS.
No. 307,810. Patented Nov. 11, 1884.
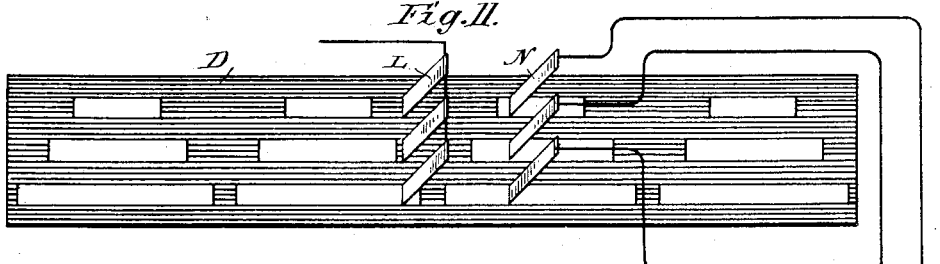
Fig. 11.
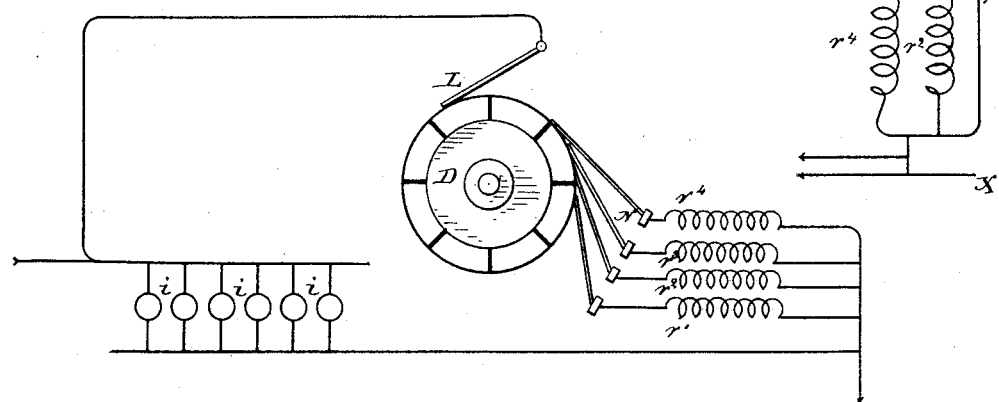
Fig. 12.
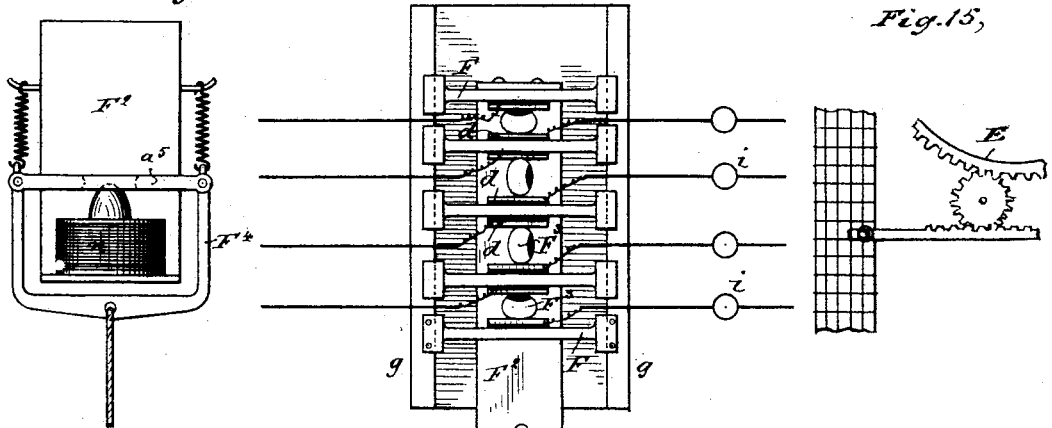
Fig. 14.  Fig. 13.  Fig. 15.
Witnesses:
Ernest Abshagen
Thos. Dorney
Inventor:
Joseph J. Skinner
By his Attorney H. C. Townsend
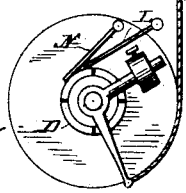
N. PETERS, Photo-Lithographer, Washington, D. C.

UNITED STATES PATENT OFFICE.

JOSEPH J. SKINNER, OF NEWTONVILLE, MASSACHUSETTS.

APPARATUS FOR REGULATING AND DISTRIBUTING ELECTRIC CURRENTS.

SPECIFICATION forming part of Letters Patent No. 307,810, dated November 11, 1884.

Application filed March 27, 1884. (No model.)

*To all whom it may concern:*

Be it known that I, JOSEPH J. SKINNER, a citizen of the United States, and a resident of Newtonville, in the county of Middlesex and State of Massachusetts, have invented certain new and useful Improvements in Regulating and Distributing Electric Currents, of which the following is a specification.

My invention relates to means of regulating the supply of electric current to incandescent electric lamps, electric motors, or other translating devices; and its object is to provide a simple and thoroughly-efficient means whereby the current shall be automatically adjusted to the number of lamps or other apparatus in use, and whereby at the same time the lamps or other apparatus may be switched into and out of circuit without injuriously affecting other apparatus on the same circuit. When incandescent electric lamps are arranged in multiple arc and in a group upon an electric circuit, and are combined with a system of regulation and supply in accordance with my invention, they may be safely and practically run upon the same circuit with electric-arc lamps.

. My invention consists, primarily, in the combination, with two or more incandescent electric lamps or other translating devices, of any suitable means whereby the current to said translating devices may be adjusted or changed and a controlling device associated with each lamp or other apparatus, so as to be energized or acted upon whenever said lamp is put into use, and acting upon the common current-adjusting mechanism in such way that the adjustment of the latter will be governed directly by the number of lamps or other apparatus in use. In carrying out this portion of my invention I preferably employ controlling electro-magnets, one for each electric lamp or other apparatus, and cause each controlling-magnet to produce a definite or determinate adjustment of governing mechanism irrespective of the strength of the current affecting said magnet. By suitable mechanism I combine the effects of the magnets or other devices, so that when two or more are energized the adjusted movement of the mechanism is the sum of the movements that are produced by the action of said magnets individually. In this respect, as will be readily seen, there is a marked difference between my system and any system in which the amount of adjustment imparted to the current-governor is dependent upon the strength of a magnet whose strength varies with the variations of current strength produced by the introduction of the translating devices into the electric circuit.

My invention consists, also, in the combination, with two or more incandescent electric lamps or other translating devices, of a means common to said devices for shunting current in variable amount through a branch of practically no resistance around them, and a controlling electro magnet or magnets or other suitable device for each of said translating devices, arranged to be energized simultaneously therewith, so as to impart a cumulative adjustment to the variable shunting device dependent absolutely upon the number of translating devices in use.

My invention consists, also, in automatically adjusting the current-governor, when combined with the translating devices as above described, by devices suitably arranged to give a counter-movement to that given to the governor on the throwing in of lamps or other translating devices, and controlled according to the variations in the strength of the current by which the lamps are run, so as to automatically cause a movement of the current-governor in a proper direction to decrease the current flowing to the translating devices when this exceeds a predetermined value. One of the means which may be employed for controlling the flow of current to the translating devices consists of a commutator or circuit-controller adapted to close an electric circuit intermittently at sufficiently-rapid intervals to produce the practical effects of a continuous current, and in varying the length or duration of the unit intervals to vary the total current effects. I have described such a device in another application for patent filed by me December 17, 1883, No. 114,708, and have therein shown it as applied to delivering current to a sub-circuit containing a working resistance, and as also arranged to vary the current in said circuit by varying the length of the intervals or periods of closure to a branch around said working resistance, and containing another resistance, (working or artificial.) In my present method of utilizing my improved commutator for the purpose of varying the current flow to a sub-circuit or a group of working resistances or translating devices, I prefer to make it close a shunt around them of practically no resistance during rapidly-intermitting periods, each of graduated or determinate length, said periods being made longer or shorter, according as it is desired to decrease or increase the amount of current flowing to the translating devices.

My invention consists, further, in the combination, with a current-regulator of the general kind described in this and my preceding application, of an electric motor for running the same, said motor being placed in the circuit or a branch of the circuit upon which flows the current to be controlled or governed.

My invention consists, further, in certain combinations and sub-combinations of devices whereby the general and special objects of my invention may be better carried into effect, and whereby the invention may be applied with better results to the regulation of the current for a group of incandescent electric lamps, s, or other translating devices.

I will first describe my invention in connection with the accompanying drawings, forming a part of this specification, and will then point out the novel features thereof in the claims.

In the accompanying drawings, Figure 1 illustrates one form of mechanism and one arrangement of circuits and apparatus whereby my invention may be carried into effect. Fig. 2 is an edge view of the governing apparatus shown in Fig. 1, one only of the magnets and supports therefor being illustrated. Fig. 3 illustrates in side view an improved arrangement of the controlling-magnets whereby they may act cumulatively upon the adjustable current governor or controller, and whereby, also, a more perfect or complete counter-adjustment may be at the same time effected for the purpose of compensating for changes of current strength. Fig. 4 shows in elevation the apparatus illustrated in Fig. 3. Fig. 5 is a detail view showing the brush-holder of Fig. 4 in section. Figs. 6 and 7 show preferred arrangements or dispositions of the magnets shown otherwise in Figs. 1 and 3. Fig. 8 illustrates an improved arrangement of the commutator or switch conducting surfaces and brushes, whereby the intermittent closures of circuit to a branch may be individually followed by breakings of the main circuit or another branch carrying the main current when the first-named branch is closed. Fig. 9 illustrates, diagrammatically, a way of carrying out my invention with a current regulator or governor consisting of a variable resistance in a branch around the working resistances. It also shows the latter feature combined with apparatus for effecting a variable shunting of current by closing a shunt at rapid and short intervals of variable length. Fig. 10 illustrates, diagrammatically, an improved method of carrying out my invention, and shows also the preferred manner of arranging the apparatus when the current-governor is driven by an electric motor in a branch of the circuit. Fig. 11 illustrates an arrangement of resistances and contact-brushes designed to diminish sparking at the surfaces of the revolving current-regulator. Fig. 12 illustrates a similar arrangement. Fig. 13 shows in elevation a construction in which mechanical devices are made to take the place of the controlling electro-magnets in such way that the cumulative adjustment is effected by the mechanical action of the electric switch that turns on the light, instead of by the action of electro-magnets energized by the closing of a circuit when the switch is operated. Fig. 14 represents a modification.

Referring to Figs. 1 and 2, D indicates a disk or wheel mounted on a suitable shaft, $D^2$, and having upon its periphery a number of insulated conducting-plates, as indicated in Fig. 2. The plates, insulated from one another, are mounted in any suitable manner after the manner of the commutator-plates for a dynamo-electric machine. The disk is revolved at a suitable speed by power applied through a pulley, $D^3$, or by other means. Upon the edge of the disk bear the two conducting-springs or sets of springs, L N, one of which is adjustable circumferentially with relation to the other, so that they may either bear on the disk in the same axial line or may be displaced with reference to one another. When in line, they will remain electrically connected with one another for the whole space of each one of the insulated plates; but if the brush N, for instance, be adjusted forward with relation to the brush L, the period during which they are in electrical connection as they pass over each plate is lessened. While they bear on different plates the circuit between them will be broken; but so long as they bear on the same plate they will be electrically connected. If they be displaced with relation to one another, as shown, and the disk be revolved rapidly, the circuit of which the springs form a part will be rapidly and intermittently broken and closed; but if a sufficiently-rapid movement be given to the disk the effect in the circuit will be practically that of a continuous current, whose strength would, however, vary according to the duration of each of the intermittent closures, increasing with the increase in the period of such closures, and diminishing with a decrease in the period.

If the springs N L be made to form a portion of a shunt or short circuit around a working resistance or a number of working resistances supplied with current from any suitable source, the amount of current shunted through N L will obviously depend upon the duration of each intermittent closure, more current being diverted from such resistance the nearer the brushes are in line, and the longer the consequent duration of each closure.

It is obvious, therefore, that by shifting the brush N backward and forward with relation to L the amount of current shunted through L and N may be varied, a forward adjustment of N decreasing the length or duration of each intermittent closure and increasing the amount of current forced into the branch around L N.

The main or supply conductor is indicated by letters X Y, and $i\ i\ i\ i$, &c., indicate a group of incandescent electric lamps, electric motors, or other working resistances arranged in multiple arc connected with said conductor, and each furnished with a suitable switch for throwing it into and out of circuit. It is well to have one or more of these switches so arranged that when its lamp is not in use it will close a shunt containing a resistance, as $c^2$, about equal to that of its lamp. The brushes N L, when bearing on the same plate of the disk D, form with their connections a short or shunt circuit of practically no resistance around the group of lamps or other devices, and nearly all of the supply-current will, under such conditions, flow through the brushes N L and to other groups of working resistances, or to electric-arc lamps upon the same supply-circuit. When any of the particular group of lights shown in Fig. 1 are to be used, the disk D must be rotated at a suitable speed, preferably quite high, but depending on various circumstances of current-supply and the number of segments in the disk. An independent shunt of no resistance from X to Y, (shown in the drawings,) and containing a plain switch, Z, is employed, and its circuit kept closed, except while D is rotating at proper speed. Placed in each multiple-arc connection containing a lamp, $i$, so as to be energized when the circuit is closed to a lamp, is an electro-magnet, $m$ or $n$, which magnets may be simple straight-bar magnets or may be double or horseshoe magnets. The magnets $m$ are arranged in the arc of a circle on separate swinging supports or strips $m^2$, each of which carries at its bottom a thin flat plate of iron, $m^3$, forming the armature of one magnet and the cross-bar connecting the two legs of the next magnet. The plates $m^3$ may be varnished or covered with other thin magnetic insulation, so that they will not stick to the magnets by remanent magnetism. Each magnet starting from the left in Fig. 1 is mounted on the plate which forms the armature for the next magnet to the right. The left-hand plate $m^3$ is simply an armature for a magnet, $m$. The suspending strips or supports $m^2$ are hung from a stationary rod or shaft, T, in line with the shaft of the revolving commutator-disk D, and may turn upon said support freely. They might be mounted in any other desired manner to secure this result. By a quarter-twist in these strips each one may be hung from the shaft through a hole in the upper end of the strip, while the armature-plates hang parallel with the shaft. These armature-plates are perforated at the center to allow the passage of a rod, E, curved in an arc of a circle. This rod E is firmly attached to the plate on which the magnet $n$ is mounted, but passes freely through the other plates, except that it is held by the extreme left-hand plate by any suitable means, as by means of an adjustable nut, $h^2$, screwed on the rod and carried by said plate or its support. The plate carrying the right-hand magnet $m'$ is widened or extended so as to be held and adjusted in position by the screw $k$ and spring $s$. Springs S keep the armatures separated from the magnets, except when currents flow in said magnets. Hooks $h$ or other suitable devices are used to prevent the armatures from being forced out of range of the magnets, and to cause the movement of the armature for any magnet to be communicated to all the strips, magnets, and armatures to the left of it. They may also serve to prevent lateral displacement of the parts. Each hook is attached firmly to a strip, $m^2$, and its hook end engages with the next strip to the left, Fig. 1, in such way that any strip may move up to the next strip to the right under the magnetic influence of the magnet on the latter; but that movement shall at the same time be mechanically produced in all strips to the left and in the rod E, without, however, necessarily changing the relative position of any other magnet and its armature. The movement thus communicated by any magnet to the rod E is a certain or absolute one, and is determined by the distance between the armature and the magnet when no current is passing, and is also entirely independent of the strength of the ordinary current flowing in $m$ and $i$, or the strength of the springs S, the adjustments and the power of the magnet and springs being properly related to produce such result. When all or any of the magnet $m$ are energized, the motion communicated to the rod E is obviously the sum of the motions of the armatures. These magnets are the principal controlling-magnets of the system, and serve to impart movement to the adjustable member of the particular current-controller that may be employed, (in this case to the brush N,) so as to determine the amount of current that shall be furnished to the lamps or other working resistances. When currents flow in magnets $m$, the motion of the armatures toward their magnets will cause the magnet $n$ to be pushed to the right. This magnet is preferably made with a paraboloidal pole and with a perforated armature, so as with a given current in $n$ to produce a practically uniform pull on its armature through a considerable range of motion. This motion is limited by the spring S' and stop $k'$, attached to an arm carried by a horizontal piece firmly connected with $n$ and moving with it. The swinging strip or support $m^4$, which carries the armature of $n$, should be heavy enough to make a good support for a cross-piece, Fig. 2, carrying the brush-holder B. The brush N, held by B, will, by the devices shown, be shifted (forward) on the commutator by the closing of any of the armatures on the magnets $m$. The brush L may be held in a fixed holder, C, attached to any suitable support. Each sub-branch containing a light, $i$, has its own switch opened or closed by a button or other device.

At the beginning of an evening, or as often as may be found necessary, the apparatus may be adjusted as follows: The switch Z being closed and all the light-circuits being open, let the armature of the magnet $n$ be closed by the screw $k'$, and let the proper speed be set up in D. We can then adjust the position of brush N by means of the screw $k$ acting on the support $m^2$ for the right-hand magnet $m'$, the motion thus produced being communicated through the hooks $h$, the nut $h^2$, and rod E. This adjustment having been made so that N and L shall be equally forward on the disk, and so that, as a consequence, the greatest possible amount of current will pass through said brushes, the switch Z may be opened and the circuit through the lamp in the branch with the magnet $n$ be closed. The circuit of this particular lamp is shown provided with a shunt containing a resistance, $c^2$, Fig. 1, equal to that of the lamp, so arranged that there is always a closed path either through the lamp or the shunt. By means of the screw $k'$ and the adjustable spring $s'$ the brush N may then be set forward so as to force enough current through the lamp in circuit with $n$ to give it the desired degree of illumination, and yet so that any further increase of current strength in $n$ from any cause will enable that magnet to draw the brush N back somewhat, and so prevent a higher current in the lamp than is desired. The diversion of current produced by this apparatus is due to the fact that under such conditions current flows through N L at intermittent periods, each reduced in length to a certain degree. During the intervals thus produced between the periods the current is forced to flow to the light. As is apparent, the duration of each intermittent period and the consequent amount of current shunted will determine the amount of current that shall be forced into the circuit containing the lamp. The above adjustments, once made, should be very durable, and it will now be possible to switch the lights $i\ i$ in and out of circuit at pleasure, leaving all the apparatus to take care of itself. The closing of any circuit will energize a magnet $m$ and close the armature of that magnet, and by means of the hooks $h$, rod E, and its connections, N will be pushed forward on the commutator far enough to give the right current.

In order to make sure that the closing of the circuit through a magnet $m$ will produce the right amount of movement of the brush N to give the desired increase of current for the light thrown in, we may originally stay one armature when its magnet is energized, compel the movement of the armature to be made slowly, and observe the effect on the lights in circuit. If we find that the motion provided is too much or too little, we can reproportion some of the parts; or, by making the hooks $h$ adjustable either in themselves or by a motion lengthwise of the strips that support them, we may adjust the limit of the distances between the magnets $m$ and their armatures so that the opening or closing of any circuit shall give the right amount of motion to the brush N.

The magnet $n$ and its armature $a$ provide for slight or unforeseen variations. It will be seen that if the current supplied to the lights is too weak to give the desired brilliancy no other harm arises, only it will be necessary to make some adjustment of the hooks $h$, so as to leave greater range of motion of magnet-armatures $m^3$. This adjustment, having been once found, would need no further change so long as the main current in X Y is kept constant; but if for any cause the current in the magnets $m$ becomes too strong there will be a corresponding change in $n$, which will attract its armature and draw back the brush N to a position where less current will be taken from the main. In order that this latter automatic prevention of too strong a current may take place, it is of course necessary that the circuit of $n$ be always complete, a provision for which exists in the presence of the extra branch containing the artificial resistance $c^2$, which branch is closed when the switch is turned to break the circuit of the lamp in circuit with $n$. It will be noticed that it is of no consequence which of the magnets $m$ is first energized. Each one, when its circuit is closed, produces a motion of the rod E to the right, and a consequent motion of the brush N.

In Fig. 2 one of the hooks $h$ is shown as passing through a slot in one of the strips, and as adapted to turn sidewise. If the hook have a lengthwise adjustment on the strip, the distances between $m\ m$ can be changed.

It is evident that the number of lights in a group may be greatly varied, and the number of groups taken from a main line is not limited. Measurement of current used may easily be recorded by attaching a pencil to the end of E and drawing a ruled paper ribbon under it by clock-work, or by some power which shall move the ribbon uniformly or intermittently at regular intervals—say by impulses every five minutes. If the lengthwise rulings are the same distance apart as the magnets $m$ move, the lateral position of the recorded line would show at a glance the number of lights in use at any time. The time of lighting and extinguishing lamps would be indicated by the cross-rulings, and the total number of "light hours" of service would be obtained by the easiest possible summation. With a large number of lights the pencil for recording the current used may more conveniently be carried in a separate mechanism, and controlled laterally in a straight line by a connection moving proportionally to E—say by a rack and pinion, as indicated in Fig. 15.

It is evident that I am not restricted to having the apparatus work in a vertical position, but that with simple and obvious precautions it may be placed horizontally.

In Figs. 3 and 4 is shown an arrangement in which each branch containing a working resistance contains both a magnet m, for adjusting the current-governor so as to throw more current into the circuit for the lamps when a light is turned on, and a magnet n, for diminishing the flow in that light when from any cause the flow becomes excessive.

As in Fig. 1, the magnets m are of such strength as to completely close their armatures when the current is turned on and flows through them; but the magnets n are of such strength as not to move their armatures at all until the current reaches the maximum strength that is permissible in any lamp. Such adjustment is obviously obtained by properly setting or adjusting the springs or retractors which tend to hold the armatures away from the magnets.

In Figs. 3 and 4 the magnets m are each supported on a cross-piece, P, running parallel with the shaft of the commutator or current-controller, and supported by a pair of swinging arms, $m^2$. Each pair of said arms is strung upon a horizontal pin in line with the commutator-shaft, and each swinging arm is given a quarter turn or twist about midway of its length. The magnets m are preferably horseshoe-magnets. The plates P are preferably of non-magnetic material—say brass—and they each carry an armature or armatures, a, for the next magnet m to the right in Fig. 3.

In order that the magnets m, when energized, may not attract the next magnet m to the right, it is better to make the poles of the magnets upon the consecutive plates P alternate in position, as shown in Fig. 6, where the relative position of the armatures and magnet-poles on adjoining plates P is shown. Springs S, Figs. 3 and 4, as before, serve to keep the armatures normally separated from the magnets, but to nevertheless permit any armature to be drawn up to its magnet when the latter is energized. The springs S, as in Fig. 1, are interposed between the swinging arms $m^2$, by which the magnets and armatures are supported. Hooks h, similar to those of Fig. 1, connect the consecutive plates or supports $m^2$, and serve, when any magnet m, Fig. 3, draws up its armature, to communicate the motion thus produced to the arms to the left of said magnet and to the left-hand pair of arms carrying a plate, $P^2$, by which the extreme left-hand armature a is supported. Connecting this same pair of arms, but in a lower plane, is a cross-piece, P', carrying the left-hand magnet of the series of magnets n, one of which is in each of the branches containing an electric light or other working resistance. Each of the magnets n is carried on a cross-piece, P', connecting a pair of swinging arms, $m^4$, mounted on the same shaft with the arms $m^2$, but set outside of the latter pairs of arms, so that the pairs of arms $m^4$ and their supported parts may move without interfering with the movement of the arms $m^2$ and their parts. Each of the plates P', except the left-hand one, Fig. 3, carries the armature or armatures a' for the next magnet n to the left. The extreme right-hand armature a', Fig. 3, is carried by a plate supported from the pair of arms $m^4$, by which movement is communicated to the adjustable portion of the current-governor—in this case the brush N. The armatures a' are preferably perforated armatures, and work over the conoidal or tapered poles of the magnets n. In order that successive magnets may not interfere with one another, their poles are made to alternate in position, as indicated in Fig. 7. The magnets n, Fig. 3, act to pull their armatures and the arms $m^4$ to the left, and motion is transmitted from any pair of arms $m^4$ to the extreme right-hand pair by means of the hooks h', connecting them in a reverse manner to that in which the hooks h connect the pairs of swinging arms $m^2$. Springs S' are interposed between the pairs of arms $m^4$, in order to hold the armatures a' away from the magnets or to allow them to be gradually drawn nearer to said magnets, according to the amount of increase in the current beyond the normal or proper amount. During normal flow of current the armatures a' are held away from the magnets n to the extreme distance permitted by the length or adjustment of the hooks h'. Whenever any magnet m is energized, its armature will move a definite or determinate distance to the right, Fig. 3, and will, through the hooks h, communicate such movement to the extreme left-hand pair of arms $m^4$, from which the left-hand magnet n is supported. This movement is, through the springs S' and the pairs of arms $m^4$, communicated to the right-hand pair carrying the brush N, thus moving the latter a little to the right, so as to decrease the shunting-power of the current-governor. Whenever any magnet n is so greatly energized as to overcome a retracting spring S', the brush N will be moved to the left by means of the hooks h' and arms $m^4$, thus increasing the shunting-power of the current-governor and bringing down the current flow in the light or working-resistance circuit to the proper regulated amount. As will be obvious, the movement of brush N to the right will depend absolutely upon the number of magnets m that are energized, and will be equivalent to the sum of the individual movements of the armature a. Its movement to the left under the action of magnets n will be entirely independent of the number of magnets m that are energized, and will be governed by the sum of the movements given to the armatures a' by said magnets n. The magnets m can be made with conoidal poles, if preferred, and their armatures can be perforated armatures. It is not necessary that there should be a magnet n, Figs. 3 and 4, in every circuit. A portion of them might be dispensed with and a rigid connection similar to the rod E of Fig. 1 substituted. Thus, for instance, the two middle magnets $n$, Fig. 3, might be discarded and their place taken by a rigid connection, (indicated in dotted lines at $E^2$.)

Adjusting devices as follows are provided: One or more of the circuits containing $i\ i$ are arranged, as in Fig. 1, to be always closed, either through the light or an equal resistance, $c^2$. The shaft or pin on which the arms $m^2\ m^4$ are strung, Figs. 3 and 4, is supported rigidly at its ends and prevented from turning. One of the arms $m^2$, from which the extreme right-hand magnet $m$, Fig. 3, is supported, is provided with an extension, $t'$, against which bears an adjusting set-screw, $k^3$, the latter serving to move the whole structure through a limited range of motion. The screw $k^3$ works in an arm, $t$, projecting from a sleeve, $u$, which sleeve is carried by the fixed pin or shaft, and can be fastened by a set-screw, $k^4$, in any desired position. By loosening the screw $k^4$ the whole apparatus can be rotated around the shaft to approximately the best position, where it can be set by the screw $k^4$. The final or delicate adjustment is then made by the screw $k^3$. The disk D being revolved at proper speed, and all the magnets being inactive, except the one or more whose paths are arranged to be always closed, the lights in these particular circuits are switched into circuit and the screw $k^3$ turned until the desired degree of illumination in these lights is obtained, after which permanent adjustment the lights may all be thrown out or in at pleasure, leaving the apparatus to take care of itself. The springs and hooks are made to be movable lengthwise of the arms $m^2$ and $m^4$ for adjustment. When the slots between the segments of the current-controller are straight, I prefer to make the brush N in several parts, or as a compound brush, each portion of which bears on the commutator at a different circumferential point, so as to produce a gradual transfer of current at the successive interruptions made by the current-controller.

To provide for a convenient adjustment of the different portions of the brush, as well as to permit the employment of graduated resistances to reduce sparking, I make use of a stepped block of insulating material, $Q^2$, which latter is mounted upon the arm Q, Figs. 4 and 5, and carries on each step one of the springs or brushes making up the compound brush N. Each portion of the brush is independently adjustable, so that the bearing-surface may be set to slant across the commutator.

The arrangement of the brushes and resistances for the purpose of preventing injurious spark at the breaking of the shunt-circuit is indicated in Fig. 12 in detail, the distance between the parts being exaggerated. Artificial resistances graduated in amount, and as many as desired, are indicated at $r'\ r^2\ r^3\ r^4$, and are of increased resistance in the order named, $r'$ being of very low or of no resistance, while $r^4$ is of quite high resistance. These resistances are respectively in the separate circuits of the insulated portions of the compound brush, and the individual portions of the brush are so set that the circuit through the lowest of the resistances will be broken first and that through the highest last, thus breaking the shunt-circuit gradually. By the arrangement shown in Fig. 11 the shunt-circuit may be both made and broken gradually. In this figure the commutator is shown as developed and as divided into three or more rows of conducting-segments, one row for each portion of the compound brush. The brush L may or may not be made in separate corresponding parts. The segments of the various rows differ in length, as indicated, those connected with the branch of lowest resistance being shorter than those connected with the branch of highest resistance, so that circuit will be made first and broken last through the latter.

In making and breaking the circuit from the brush N to L, resistance will be gradually removed or introduced, as the case may be, so that the change will be gradual enough to avoid injurious spark at the commutator. In this figure the difference in length of the segments in the different rows is exaggerated.

I have explained my invention on the supposition that incandescent electric lamps are used in the various circuits or sub-circuits in which the flow of current is governed by the current-governor. It is clear, however, that any other working resistances could be substituted in place of the lamps $i\ i$, &c., and that these working resistances need not be all equal. Some or all of them may be groups of lights or other translating devices. If the range of motion of each magnet $m$ is adapted to supply its own particular circuit with the right amount of current, the adjustment will remain, provided the current-supply is kept up to the demand. By giving the armature of each magnet $m$ a slight excess of range of movement, the magnets $n$ would control the position of their armatures, and thus the position of the brush N.

So far as my invention consists in providing a separate magnet or operative element to be called into action simultaneously with the use of each particular translating device, and adapting the separate magnets or elements to act cumulatively upon the devices for supplying or controlling current, I do not limit myself to any special current-controller or means of modifying a current-supply. Whenever it is desired to use a variable number of translating devices in parallel arc, each of which needs a definite current, the action of the separate magnets or operative elements in each sub-circuit is to be combined to move for a definite distance a lever or set of brushes or some other device for in any way controlling a flow of current; or the motion may be used to govern, by any known means, the total amount of current generated or supplied by a battery or dynamo-machine; or, if a variable number of translating devices are used in series, separate magnets in circuit with them when in use can be similarly made to act cumulatively on a lever or other device that controls the total electro-motive force of a generator. The motions to be produced by the separate magnets or elements in question are all of definite amount, no matter what the strength of the current that causes them. I then provide some or all of the translating devices with safety contrivances, magnetic, heating, or other, shown here as the magnets $n$, Figs. 1 and 3, such that if the currents in the translating devices increase beyond a certain predetermined strength they will (any or all) act to move a lever, brush, or other element, so as to diminish the flow of current in them. The motion in this latter case is not by a jump or leap, as with the armatures of the magnets $m$, but may be little or much, according to the tendency of the current in the translating devices to rise above the predetermined strength.

If the magnets $n$ are constructed to have a considerable range of motion, the apparatus described will be adapted to furnish currents of sufficient constancy for incandescent lights or many other uses, even though the supply-current should vary a great deal. The magnets $m$ and their armatures would be set so as to give a sufficient amount of current to the lights when the supply-current is at its minimum, and if afterward the supply-current increases, the magnets $n$ would act to diminish the proportion flowing in their branches, and the actions of the magnets $n$ would be cumulative in their effect on the motion of the brush N or other means for controlling the relative current in the main and the branch. With a dynamo that is capable of yielding a variable current to correspond with the calls made upon it, a complete system of economical distribution is furnished.

In describing my invention I have hereinbefore assumed that the flow of current in the portion of the circuit containing the working resistances is best determined or regulated, when a current-governor of the peculiar form shown is employed, by variably shunting the current away from such resistances through a branch of practically no resistance at rapidly-recurring unit periods of determinate length, the amount of current flowing to the working resistances being increased by shortening the duration of the unit periods and decreased by lengthening the duration of the unit periods. Under some conditions, however, it may be deemed desirable to govern the flow by admitting current to the portion of the circuit containing the working apparatus—such as lamps—at intermittent and rapidly-recurring periods of determinate length, and to govern the amount of current flow to the lamps by lengthening the duration of the individual periods to increase the flow, and by shortening the duration of the individual periods to diminish the flow. This plan would ordinarily involve the employment of a high resistance in the constantly-closed branch around the working resistances, to force current into these, and to provide a path for the current to other apparatus on the circuit in the periods or intervals during which the circuit to the working resistances is broken, and I have herein illustrated in Fig. 8 the provision of such a resistance. It is practicable, however, with such a plan of governing the current flow, to combine with it some means for breaking the branch around the working resistances for variable intervals while the circuit is closed to such resistances.

Fig. 8 shows one form of commutator adapted to produce this result, developed on the plane of the paper. The commutator-cylinder is provided with two lines of conducting and non-conducting spaces. Upon one line bear the brushes N and L, through which current flows to the working resistances $i$ $i$ from the main X Y. The non-conducting spaces are indicated in black, and the time in each rapidly-recurring period during which the current is permitted to flow to such resistances evidently depends upon the time during which N and L are on the same conducting-segment. This is governed by adjusting the brush N toward L to increase the flow to the working resistances, and away from it to diminish the flow. $R^7$ indicates an artificial resistance which is in a branch around the working resistance, and serves to convey the current of the main circuit X Y when the circuit through N L is broken. The circuit through $R^7$ is completed and broken by means of the set of brushes $a^3$ $b^3$ $c^3$ $d^3$ bearing on a second line of conducting and non-conducting segments, and electrically connected to one another and to the line, as shown, so that the current may flow through $a^3$ $b^3$ as a compound brush to $c^3$ $d^3$ across the conducting-segments. The non-conducting spaces are less in length than the conducting, and the distance between the two brushes $a^3$ $b^3$ is greater than the length of a non-conducting segment and less than that of a conducting-segment, so that the wire connected to $a^3$ $b^3$ may always be in connection with a conducting-segment. The brushes $a^3$ $b^3$ are fixed, as is also the brush $d^3$. The brush $c^3$ is adjustable. If $c^3$ and $d^3$ are in line, there will always be a passage for the current through $R^7$; but if $c^3$ be moved to the left it may take a position, as shown in the figure, such that when the commutator-cylinder occupies the position shown no current can pass through $R^7$. The brush $c^3$ may be controlled by the same shifting device which controls the duration of the individual closures to the working resistances through N L, or by other means, and can evidently be set so as to open the circuit through $R^7$ immediately after the circuit is closed through N L to the working resistances. In the operation of such a device at each intermittent connection the current would first partially flow through the working resistances and through resistances $R^7$, the amount flowing in the working resistances depending upon the relative proportion of their resistance to that of $R^7$. Then the main circuit through R⁷ would be opened and left open for an interval depending upon the adjustment of brush c³. Then the circuit through R⁷ would be again closed, and finally the circuit through the working resistance broken.

R⁸ indicates a very high resistance in a shunt which is supposed to be always closed, and to thus furnish a path for the current on x y in case through an over adjustment or movement of the brushes c³ N there should be rapid and total interruptions of the path through the commutator apparatus.

Fig. 9 illustrates a modification of my invention, and shows how the principle thereof may be applied to a current-controlling device consisting of a variable or adjustable resistance. The lights or other working resistances are in multiple circuit at i i i, and associated with them, but not shown in the drawings, is the apparatus hereinbefore described, or similar apparatus whereby magnets in circuit with i i i may act cumulatively upon the arm m⁴ to move a brush, A², to the right over a variable resistance in a branch, 7, around said lights, to shunt less current from the lights as the number of lamps in circuit is increased. The adjustable resistance here shown consists of a series of artificial resistances, C², arranged in multiple arc, and the movable contact-spring A², arranged to move over a series of corresponding contacts, each completing the circuit to an artificial resistance. The contacts are arranged in the arc of a circle, and the contact spring or brush A² in the position shown is supposed to close the branch 7 through all of the resistances C² in multiple arc, so that the total resistance is the minimum. As the brush A² is moved to the right the number of resistances in circuit diminishes, and the total resistance of that branch gradually increases until with but one of said resistances C² in circuit the resistance reaches the maximum. The brush A² is attached to an arm, m⁴, similar to that already described for imparting movement to the adjustable brush of the commutator, Fig. 3. The individual resistance C² may, if preferred, be each equal to the resistance of one of the lamps i or other working resistance. The use of such resistances may, if desired, be combined with the use of a current-controller or commutator such as previously described. When so combined, we may use a disk, D, similar to that already described, L N being the brushes bearing on the same. Through these brushes a shunt of comparatively no resistance is completed at rapidly-recurring intervals, as before described. The adjustable brush N is not mounted on the arm m⁴, as in the previous figures, but upon an independent movable arm, J², actuated by a retractor, S⁴, and brought to rest by a stop, T⁴, so as to hold the position shown in the figure when none of the lights i are in use, and to thus shunt away current to a certain or fixed degree, dependent upon the amount of current which it is desired to permit to flow through the branch containing the lamps for operating a certain fixed number of them, depending on the number of resistances C² whose use is desirable. When the brush is moved upward or to the right against the influence of its retractor S⁴, the shunting capacity is diminished; but this movement only begins to take place after m⁴ has moved to such a distance as to exhaust the capacity of the artificial resistances C² and A² to compensate for lights thrown into circuit, and to bring an arm, K⁵, attached to m⁴, against the movable support J² for brush N. When one of the lights i is started, the arm m⁴ will be moved to the right by the action of the apparatus, as already described and shown. During the first part of the motion of m⁴, or while the first few lights are being thrown into circuit, the effect will be simply to increase the total resistance to the current flowing through A², as the number of lamps demanding current is increased and the resistance in the light-circuit is diminished by the starting of lights, leaving the total resistance of the combined paths unchanged. As shown in the drawings, I have supposed six of the incandescent lights would be started before the arm m⁴ would move the brush N; but any desirable number can be employed. I have shown the brushes in such position that the circuit from N to L will be broken during a part of each revolution, and these breaks of that circuit are of sufficient duration to force current enough through the light-circuit W to supply a number of lights equal to the number of resistances C² as these are successively cut out. This number of resistances can be suited to prevent injurious sparking at the commutator. After the resistances C² are all cut out by the motion of A² caused by the starting of an equal number of lights, the projection K, by further motion of m⁴, will come against the arm J² and push the brush N to the right, making the breaks in the circuit N L longer and longer as more and more lights are thrown into circuit. Finally, when all the lights i i i are in circuit, the brush N will be in position to keep the circuit N L open all the time, forcing the current through the lights all the time. Any number of groups of lights can be run in series from a suitable dynamo-machine, and with a dynamo governed by an automatic regulator to maintain a constant current the power required to drive it will be nearly proportional to the number of lights in use above a certain minimum power determined by the desirable number of resistances C².

I do not limit myself to any particular way of introducing the resistances C². They may be arranged in series instead of multiple circuit by proper modification. I have found the best results with a high velocity of rotation of the commutator.

To diminish sparking at the commutator, the brush N (or both L and N) may be compound—that is, made in two or more parts, side by side, either electrically connected or separate. If the parts of the brush N are insulated from each other, resistances of varying amounts may be introduced in the circuits of the different parts, and the segments of the commutator may be so shaped as to make and break the circuit between N L gradually, as before described. The commutator should be arranged so that when it stops rotating it will always stop with the brushes N and L on a conducting-segment, so as to shunt the current from the lights, or else it should be arranged so that a shunt around the whole is closed except when the commutator is rotating.

A centrifugal device such as hereinafter described may be made to open-circuit that safety-shunt when the velocity of rotation has reached the right point.

In Fig. 10 I have illustrated diagrammatically an arrangement in which the commutator or current-controller is run by an electric motor fed with current from the general circuit, and in which, also, other convenient devices and safeguards in working are provided. In this figure I have, for simplicity, omitted the system of strips and magnets shown in Figs. 1 and 3; but the movable brush N is supposed to be controlled by such a system in connection with the working resistances $i$ $i$ $i$, and, if desired, the artificial resistances $c^2$.

M indicates the electric motor, whose armature is fixed upon or geared to the shaft of the commutator-cylinder D. The motor is in a branch circuit, as indicated, including a magnet, $m^5$, attached to a suitable fixed support. When the motor is stationary and no current flowing in its circuit, the current of the main flows directly from $x$ to $y$ through the contacts $p$ $q$, one of which is fixed, while the other is movable with the armature of $m^5$, and is arranged so as to close the circuit when the apparatus is not in use and the magnet $m^5$ is not energized. To start the motor it is only necessary to push the arm carrying contact $q$ to the right, which will break the circuit at $p$ $q$ and energize the magnet $m^5$, (in the motor-circuit,) which will thereafter, by its action on its armature, keep the contact $p$ $q$ open. A branch from X to Y, closed through contacts $p^3$ $q^3$ when the apparatus is at rest, contains a resistance, $R^9$, preferably about equal to the resistance of the combined number of lights that the whole current will run in multiple arc with the motor also working in a branch. On the breaking of $p$ $q$ the only paths for the current are through $R^9$ and the motor. When the motor reaches a predetermined speed suitable for operating the current-controller D, a suitable centrifugal device, $D^2$—such, for instance, as that used for a steam-engine governor, and on the same shaft with D—acts upon a movable contact-controlling arm or lever, $S^6$, pivoted at $S^{10}$, and that plays between and controls the contacts $p^2$ $q^2$ $p^3$ $q^3$. Normally the spring, acting on arm $S^6$, holds the same in position to open the contacts $p^2$ $q^2$ and to permit the contacts $p^3$ $q^3$ to close. When the movable portion of the governor acts on said arm, it moves the same so as to permit the contacts $p^2$ $q^2$ to close, and thus complete the circuit to the lights $i$ $i$, or other working resistances, and the adjustable resistances $C^2$, and also to the low-resistance branch closed some of the time by the commutator D and its brushes. Immediately after closing such circuit the centrifugal device, which is properly adjusted for this purpose, moves the arm $S^6$, so as to break the circuit of $R^9$ at $p^3$ $q^3$.

The foregoing operations take place almost immediately after the original opening of the contacts $p$ $q$, which is all that is necessary to get the apparatus in operative condition for permitting the use of the incandescent lights and controlling them by devices already described. When it is desired to stop the motor, the contacts $p$ $q$ can be closed by pulling the contact $q$ to the left, which will divert practically all the current through them, and the motor will soon stop.

The devices just described provide that the current shall not be thrown through the lights except when the commutator is rotating at proper speed. If the motor-circuit should be accidentally broken, the contacts $p$ $q$ would close by the magnet $m^5$ allowing its armature to spring away from it. I also provide at $p'$ $q'$ another pair of contacts adapted to close another safety branch of practically no resistance in case of an abnormally high current flowing in the motor-circuit from any cause, $p'$ being connected with the armature of a magnet, $n^5$, in the motor-circuit, and $q'$ with the support for the said magnet. It should be understood that the arms supporting $p'$ and $n^5$ are elastic and fixed at one point.

I do not limit myself to any particular devices for shifting the circuit-controller. Any device may be used, provided it be properly constructed to shift the controller by the act of switching in and out any translating device.

I have herein described an arrangement wherein electro-magnetic devices are employed, each energized by the closing of the circuit when a switch is operated; but the same principle may be carried out by purely mechanical devices actuated by mechanical connection with the electric switches, so that the act of turning a switch will impart a definite mechanical movement to the controller, and the amount of movement will be multiplied by the number of switches that are turned. For instance, the switches for the lamps in any room or house may be arranged together, as shown in Fig. 13.

F F indicate a series of horizontal bars, one above the other, which move up and down in suitable guides. The bars are provided with conducting-strips $d$ $d$ on a portion of their upper and lower surfaces. The lower bar is fixed in position, and the bars are held apart by switch-plugs $F^3$, of conducting material, and oval in cross-section, so that a quarter-revolution of any plug in suitable bearings raises or lowers the whole series above it. Attached to the upper bar is a stirrup, F², and from the lower end of this a wire is carried down to the current-controller, supposed to be in this case located in the cellar directly underneath. The circuit of any lamp contains one of the conducting-strips on the upper side of one of the horizontal bars, and runs through the plug when in one position to the strip on the under side of the next bar above. The oval plugs have on one of their flatter sides an insulating-segment, so that when the longer diameter of the plug is horizontal no current passes across the plug, but when the longer diameter of the plug is vertical there is electrical connection through the plug between the two conducting-strips above and below the plug. The wire from the stirrup is attached to a weighted support of the movable brush N of the current-controller, and the result is that when any light is thrown into circuit by its plug the movable brush is shifted by the wire to the position necessary to properly adjust the current.

By an obvious modification one or more safety-magnets $n$ in the circuits of $i$ might be introduced by making the stirrup F² in parts, adapted to slide on each other, the armatures of the magnets $n$ being connected with the part supporting the wire in such a way as to lower it upon an excess of current in $i\ i$. Such a modification is indicated in Fig. 14, where the magnet $n$ is supported from F², while its armature carries the frame F⁴, which latter is connected to the adjustable portion of the circuit-controller. The armature is hung by springs from F², so that when the latter is raised the adjustment for an increase in the number of translating devices in use is made.

It is obvious that the recording or registering device shown in Fig. 1 as operated by the arm E may upon the same principle be operated by the mechanism of Figs. 13 and 14, so that the movement imparted to the pencil or equivalent element of the register or recorder will be cumulative, as is the movement imparted to the adjusting element of the current-governor.

What I claim as my invention is—

1. The combination, with two or more translating devices in a group, of a current-controller on the supply-circuit, governing the flow of current from the supply-circuit to the conductor leading to the group of translating devices, and an electro-magnet energized with each translating device, for adjusting the current-controller, whereby the current flowing from the supply-circuit to the group may be adjusted absolutely by the number of translating devices energized together.

2. The combination, with two or more translating devices supplied from a common conductor, of devices for governing the distribution of current between the branch of said conductor, containing the translating devices and the portion of the circuit independent of them, and means acting with each translating device thrown into circuit to impart a determinate adjustment to the governor, so as to adjust the same cumulatively according to the number of translating devices in use.

3. The combination, with two or more translating devices, of an adjustable current-governor common to the said devices for controlling the flow of current to them, mechanism for giving an adjusting movement to said governor, and controlling electro-magnets acting in common upon said mechanism and energized with each translating device, said magnets acting directly or indirectly and separately or cumulatively to impart an adjusting movement to the mechanism of the adjustable current-governor.

4. The combination, with two or more translating devices, of a commutator for rapidly and intermittently closing a circuit, so as to determine the flow of current to the translating devices, adjusting mechanism for varying the duration of the intermittent closures, and controlling electro-magnets energized with each translating device, and acting in common and directly or indirectly upon the adjusting mechanism, so as to produce a movement of the latter determined by the number of translating devices and corresponding magnets that are energized together.

5. The combination, with a group of translating devices arranged in multiple arc, of a device upon the supply-circuit and common to said group for controlling the flow of current from the main or supply circuit to the group of translating devices, and means connected with each multiple-arc branch for adjusting said controlling device so as to permit a flow of current to the group proportionate to the number of translating devices at any time in use.

6. The combination, with a group of translating devices arranged in multiple arc, of a current-governor, devices in each branch acting in common upon said governor to produce a cumulative and absolute adjustment of the same in one direction, so as to adjust the current to the number of branches closed without regard to the current flow in each, and means for automatically giving a counter-adjustment to said governor to compensate for any excess of flow.

7. The combination, with a group of translating devices arranged in multiple arc, of a current-regulator in the main or supply circuit governing the flow of current to the supply-conductor for said group, and controlling-magnets in the several multiple-arc circuits containing the translating devices, said magnets acting directly or indirectly and together or separately upon the regulator, to govern the flow of current according to the number of translating devices in use.

8. The combination, with a group of translating devices arranged in multiple arc, of a commutator for rapidly and intermittently closing a circuit, so as to determine the flow of current in the circuit containing the group of translating devices, means for varying the duration of the intermittent closures, and governing electro-magnets controlling the latter independently, and arranged in separate multiple-arc branches.

9. The combination, with a main or supply circuit, of a current-governor in said circuit controlling the flow of current to a group of translating devices arranged in multiple arc, means for adjusting said governor, a magnet in each of the multiple-arc branches, and intermediate mechanism between the magnets and the mechanism of the current-governor, whereby said magnets may act cumulatively upon the governor and produce an absolute adjusting movement of the same, determined by the number of magnets simultaneously energized.

10. The combination, with a current-governor for a group of translating devices arranged in multiple arc, of magnets $m$ in the several multiple-arc branches, acting together or separately to adjust the governor in one direction to an extent dependent upon the number of magnets energized, and one or more magnets, $n$, acting on said governor in a reverse direction to adjust the governor in an opposite direction upon an abnormal flow of current.

11. The combination, with one or more working resistances, of means for closing a shunt or short circuit around the same at rapidly succeeding intervals, each of a determinate or regulated length, and recurring with sufficient rapidity to permit a practically-continuous current to flow in said working resistance, as and for the purpose described.

12. The combination, with a group of incandescent lamps or other working resistances, of an intermittently-closed shunt closed at rapid intervals, and means for varying the period of each intermittent closure according to the number of lamps or other working resistances in use.

13. The combination, with two or more translating devices, of an intermittently-closed shunt closed at rapid intervals, a switch for each translating device or group of devices, and means controlled by each switch for varying the duration of the successive closures of the shunt-circuit, as and for the purpose described.

14. The combination, with a group of translating devices, of a current-governor and a series of electro-magnets, $m$, one in circuit with each translating device, and connected and arranged in line in the manner described, so as to act cumulatively upon the current-governor, as and for the purpose described.

15. The combination, with a group of incandescent lamps or other translating devices arranged in multiple arc, of means for breaking and closing a shunt around each group at rapidly-succeeding intervals of a determinate length, according to the total energy required in the translating devices, and with sufficient rapidity to produce in said translating devices the practical effects of a continuous current.

16. The combination, with a group of translating devices, of means upon the supply-circuit for controlling the flow of current from said circuit to the translating devices, an adjusting mechanism, and electro-magnetic devices operated simultaneously with the switching into circuit of a translating device, and acting cumulatively upon the adjusting mechanism, as and for the purpose described.

17. The combination, with a group of translating devices arranged in multiple arc, of means for variably shunting current from the same, adjusting mechanism, and electro-magnetic devices energized with each translating device, and acting cumulatively on the adjusting mechanism, so as to move the same to an extent dependent on the number of translating and electro-magnetic devices that are energized.

18. The combination, with one or more translating devices, of a commutator for rapidly and intermittently completing an electric circuit for unit periods of determinate length, so as to control the flow of current to said translating devices, an electric motor for driving said commutator, and means for closing a circuit to the translating devices when the motor acquires a predetermined speed.

19. The combination, with the commutator for rapidly and intermittently closing a circuit for unit periods of determinate length, of multiple circuit-closing contacts and graduated resistances, as and for the purpose described.

20. The combination, with two or more branches containing translating devices, of a magnet in each branch, and a recording or registering mechanism common to said magnets, and means for producing a movement thereof dependent in extent upon the number of magnets energized, and acting at the same time upon said mechanism.

21. The combination, with a commutator for rapidly and intermittently closing a circuit for unit periods of determinate length, of an electric motor driven by the supply-current whose flow is governed by the commutator.

22. The combination, with two or more electric switches, of a current governor or controller, adjusting mechanism therefor common to the switches, and intermediate devices between the switches and said adjusting mechanism, whereby said switches may act cumulatively upon said governor, for the purpose described.

23. The combination, with a group of translating devices, of an electric motor driven by the supply-current, a current-governor, a branch around said translating devices, and a switch that breaks the branch when the motor is working at a predetermined speed.

24. The combination, with a current governor or regulator, of a series of magnets and armatures mounted on movable supports, mechanism connecting one terminal of said series with the adjustable portion of the governor, and intermediate devices between the several supports, whereby the motion of any armature may be communicated to the intermediate supports between it and the said terminal.

25. The combination, with the series of independently-supported magnets and armatures, of the intermediate springs and the connecting-hooks, as and for the purpose described.

26. The combination, with the series of independently-supported magnets, of the intermediate adjustable hooks, as and for the purpose described.

27. The combination, with two or more electric lamps or similar translating devices, of a register or recorder for showing the number of lamps in use, and actuating devices actuated simultaneously with the energizing of any lamp or translating device, and cumulatively, so as to be moved to an extent determined by the number of translating devices in use.

Signed at Boston, in the county of Suffolk and State of Massachusetts, this 25th day of March, A. D. 1884.

JOSEPH J. SKINNER.

Witnesses:
E. C. WHITNEY,
B. B. PERKINS.